United States Patent [19]

Misina

[11] Patent Number: 4,724,949

[45] Date of Patent: Feb. 16, 1988

[54] CONVEYOR APPARATUS FOR DISCHARGING PRESSED PRODUCTS AND SIMILAR ITEMS FROM A PRESS

[75] Inventor: Yasuhiro Misina, Gifu, Japan

[73] Assignee: Misina Press Co., Ltd., Japan

[21] Appl. No.: 836,846

[22] Filed: Mar. 6, 1986

[30] Foreign Application Priority Data

Apr. 16, 1985 [JP] Japan ............................. 60-56688[U]
Jul. 20, 1985 [JP] Japan ................................ 60-160670

[51] Int. Cl.⁴ ..................... B65G 25/00; B65G 27/08; B65G 27/16
[52] U.S. Cl. .................................. 198/750; 198/763; 198/766; 74/55
[58] Field of Search ....................... 198/750, 763, 766; 74/26, 55, 67

[56] References Cited

U.S. PATENT DOCUMENTS

| | | | |
|---|---|---|---|
| 1,790,198 | 1/1931 | Cizek | 74/55 |
| 2,332,600 | 10/1943 | Rapp | 198/763 X |
| 2,337,174 | 12/1943 | Bebinger | 198/766 |
| 2,991,872 | 7/1961 | Keegan | 198/766 |
| 3,703,236 | 11/1972 | Spurlin et al. | 198/766 |
| 3,931,534 | 1/1976 | Gray et al. | 198/766 X |
| 4,174,032 | 11/1979 | Watkins | 198/766 X |
| 4,226,326 | 10/1980 | Watkins | 198/766 X |
| 4,243,132 | 1/1981 | Miyakoshi et al. | 198/766 X |
| 4,356,911 | 11/1982 | Brown | 198/766 |

Primary Examiner—Nancy J. Stodola
Attorney, Agent, or Firm—Ostrolenk, Faber, Gerb & Soffen

[57] ABSTRACT

An apparatus for conveying and discharging pressed products or similar items from a press. The apparatus has a discharging trough which can be mounted on a portion of the body of the press, and a reciprocating member for causing a reciprocatory motion of the discharging trough. The reciprocating member is driven by a driving mechanism so as to make such an action that a difference exists between the forward moving speed and the backward moving speed, thereby allowing the discharge of the pressed products or similar items along the discharging trough.

7 Claims, 10 Drawing Figures

FIG. 5
FIG. 6
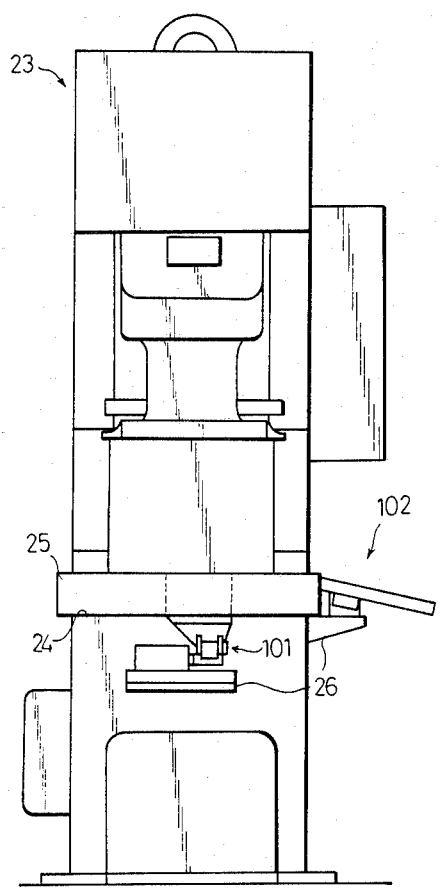
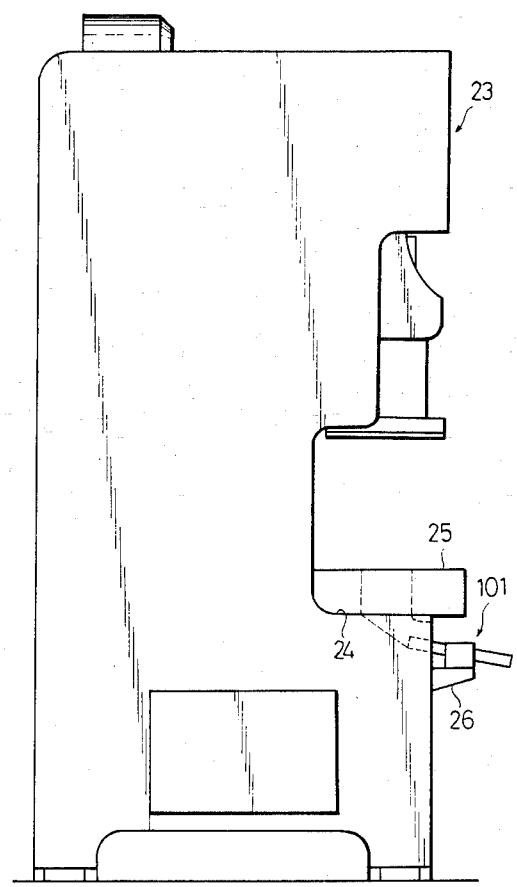

CONVEYOR APPARATUS FOR DISCHARGING PRESSED PRODUCTS AND SIMILAR ITEMS FROM A PRESS

BACKGROUND OF THE INVENTION

1. Field of the Invention

The present invention relates to an apparatus for conveying and discharging pressed products and other items such as scraps produced in a press.

2. Description of the Prior Art

Hitherto, various types of apparatus have been used for conveying pressed products or other items such as scraps from a press. Typical examples of such apparatus are conveyor-belt type apparatus and a pneumatic conveyor which makes use of compressed air.

The conveyor-belt type apparatus, however, requires a construction that is complicated and results in a large unit including a belt, a pair of pulleys around which the belt goes, and supporting members for supporting these pulleys. Such an apparatus being of a complicated construction and being large in size is not suitable for presses due to difficulty encountered in mounting the apparatus in the presses.

On the other hand, pneumatic coveyors making use of compressed air encounter difficulty in the adjustment of air pressure in accordance with the shapes and weights of the items to be conveyed. In addition, the air undesirably blows and scatters other matter such as oil, metal dust and so forth, requiring cleaning work for removing these contaminants. This considerably lowers the efficiency of the work.

SUMMARY OF THE INVENTION

Accordingly, an object of the present invention is to provide an apparatus for conveying press products and other items from a press, which is simple in construction, small in size and is easily mounted on a variety of types of presses.

The above and other objects of the invention will become clear from the following description of the preferred embodiments and the scope of the invention will be apparent from the statement in the claims attached hereto. Various advantages which are not mentioned in the specification will be clear to those skilled in the art to which carry out this invention pertains.

BRIEF DESCRIPTION OF THE DRAWINGS

FIG. 5 is a front elevational view of a press equipped with the apparatus in accordance with the invention shown in FIG. 1;

FIG. 6 is a side elevational view of a press equipped with the apparatus of the invention shown in FIG. 1;

DESCRIPTION OF THE PREFERRED EMBODIMENTS

A first embodiment of the invention will be described hereinunder with reference to FIGS. 1 to 8.

Figure 1:
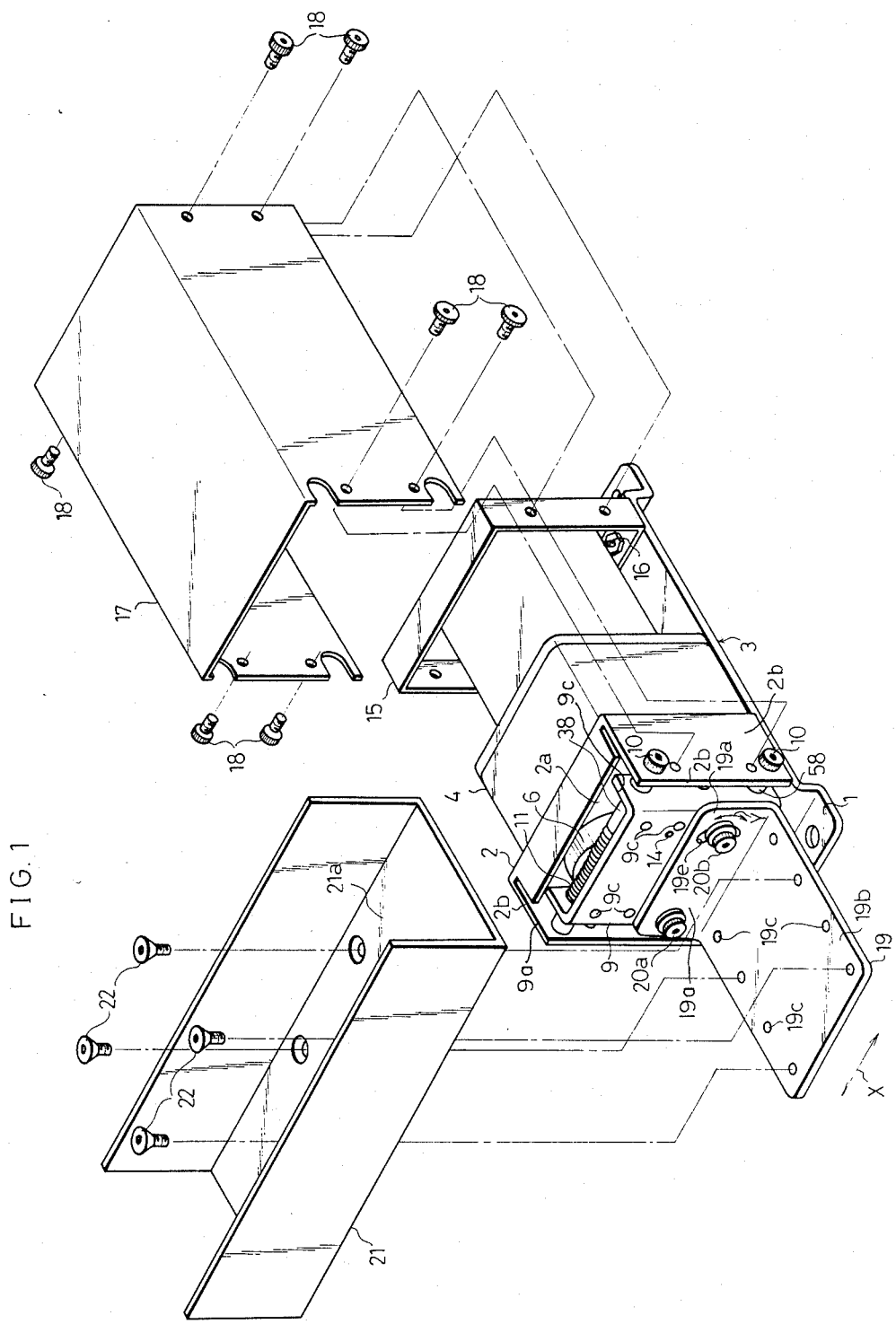
FIG. 1 is an exploded perspective view of an embodiment of conveyor apparatus constructed in accordance with the invention.
Figure 7:
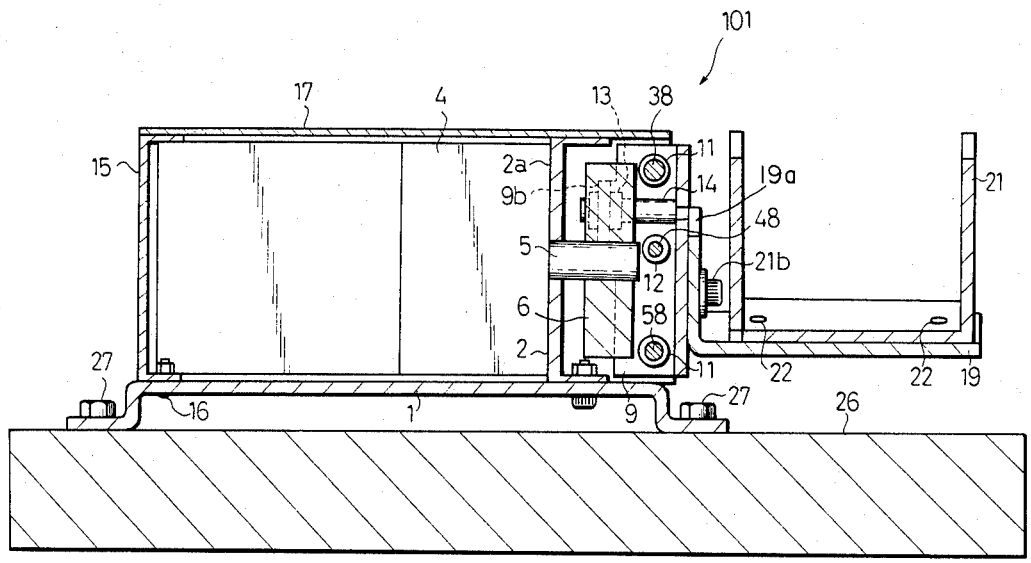
FIG. 7 is a sectional view of a press equipped with the apparatus of the invention shown in FIG. 1.

Referring first to FIG. 1, a supporting frame is fixed to the upper side of a base plate 1 at one end of the latter. The base plate 1 and the box-like supporting frame 2, in combination, constitute a mounting frame 3. In vertical cross-section supporting frame 2 is of channel form (FIG. 7). Motor 4 is fixed to the rear side of back plate 2a. As seen from FIGS. 2 and 7, the motor 4 has a shaft 5 which projects forwardly through a hole formed in the back plate 2a.

A cam 6 having an S-shaped curved contour is fixed to an end of the shaft 5. The cam 6 is adapted to be continuously driven in the clockwise direction as viewed in FIG. 2, such direction being indicated by arrow A. The cam 6 is constituted by a plurality of S-shaped segments 6a (FIG. 3) punched from a steel sheet and fixed to one another by means of four caulking pins 7. In the drawing, nine segments 6a are shown. The cam 6 has a shaft hole 6b for receiving the shaft 5. A projection 6c formed integrally with segments 6a and extending into hole 6b is adapted to be received by a recess or axial keyway 5a formed in the shaft 5. The cam 6 assembled in this way can be produced at a low cost which is about ¼ that incurred when the cam is produced by cutting a thick steel material.

Figure 2:
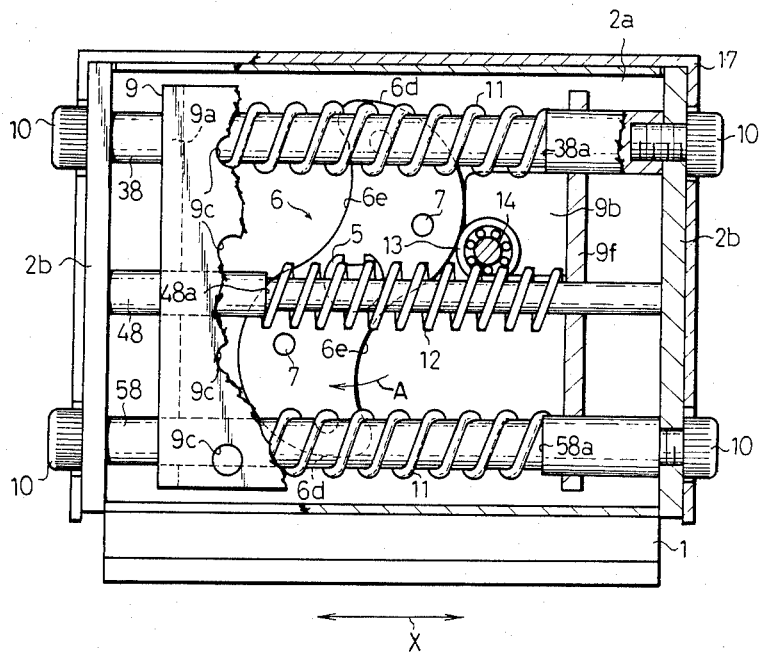
FIG. 2 is a fragmentary front elevational view illustrating the reciprocating driving mechanism.
Figure 3:
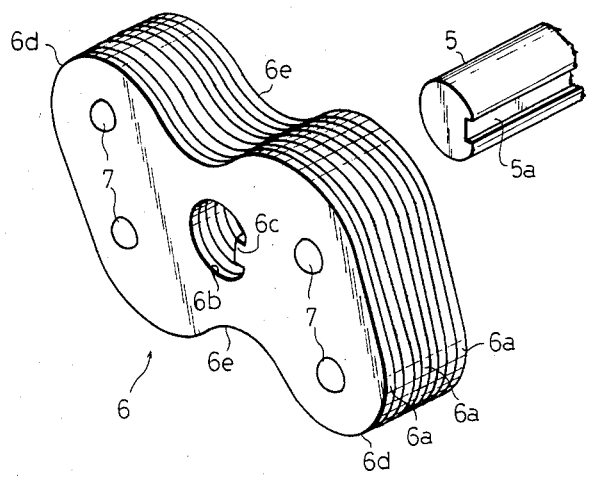
FIG. 3 is a perspective view of a cam.

Three horizontal guide pins 38, 48 and 58, which are spaced in the vertical direction, extend between both side plates 2b of the supporting frame 2, immediately in front of the cam 6. These guide pins 38, 48, 58 suports a reciprocating member 9, having a shallow channel-like shape, for reciprocatory motion in the left and right directions, i.e., in the direction of the arrow X (FIG. 2). Among these three guide pins, the upper and lower ones 38, 58 are fixed to the side plates 2b by means of bolts 10, so as to be able to stably guide the reciprocatory movement of the reciprocating member 9.

As shown in FIG. 2, the guide pins 38, 58 have greater diameter at their right ends to form steps 38a, 58a. Coiled springs 11 are arranged to act between respective steps 38a, 58a and the left portion 9a of the reciprocating member 9, thereby urging the reciprocating member 9 normally leftward as viewed in FIG. 2. The central guide pin 48 is held at a predetermined position with its both ends held in contact with the inner surfaces of both side plates 2b. Unlike other guide pins 38, 58, the guide pin 48 has a greater diameter at its left end such as to form a step 48a. A coiled spring 12 is disposed to act between the step 48a and the right end portion 9f of the reciprocating member 9. The coiled spring 12 has a force which is about three times as large as that of the coiled spring 11.

As shown in FIG. 2, a supporting portion 9b is formed on the right end portion 9f of the reciprocating member 9. The supporting portion 9b rotatably carries, through a shaft 14, a cam follower 13 constituted by a radial bearing which contacts the cam surface of the cam 6.

The motor 4, cam 6, coiled springs 11, 12 and the cam follower 13 in combination constitute a quick-feed/slow-return driving mechanism for the reciprocating member 9. Then, as the cam 6 rotates, the reciprocating member 9 reciprocates in the directions of arrows X seen in FIGS. 1 and 2.

A rectangular frame 15 is fixed to the upper side of the rear end of the base plate 1 by means of bolts 16. A motor cover 17 is secured to both sides of the frame 15 and to both side plates 2b of the suporting frame 2 by means of a plurality of bolts 18.

A plurality of threaded holes 9c are formed in the front surface of the reciprocating member 9 in two vertical rows. The vertical or back plate 19a of a mounting member 19 is secured by means of a pair of bolts 20a, 20b screwed into a pair of threaded holes 9c. It is thus possible to adjust the level of the mounting member 19 by selecting the threaded holes 9c in vertical direction. A plurality of threaded holes 19c are formed in a flat plate horizontal portion 19b of the mounting member 19. A discharge trough 21 for discharging the items such as pressed products is fixed to the flat plate 19b by means of screws 22 driven into the threaded holes 19c.

Figure 4:
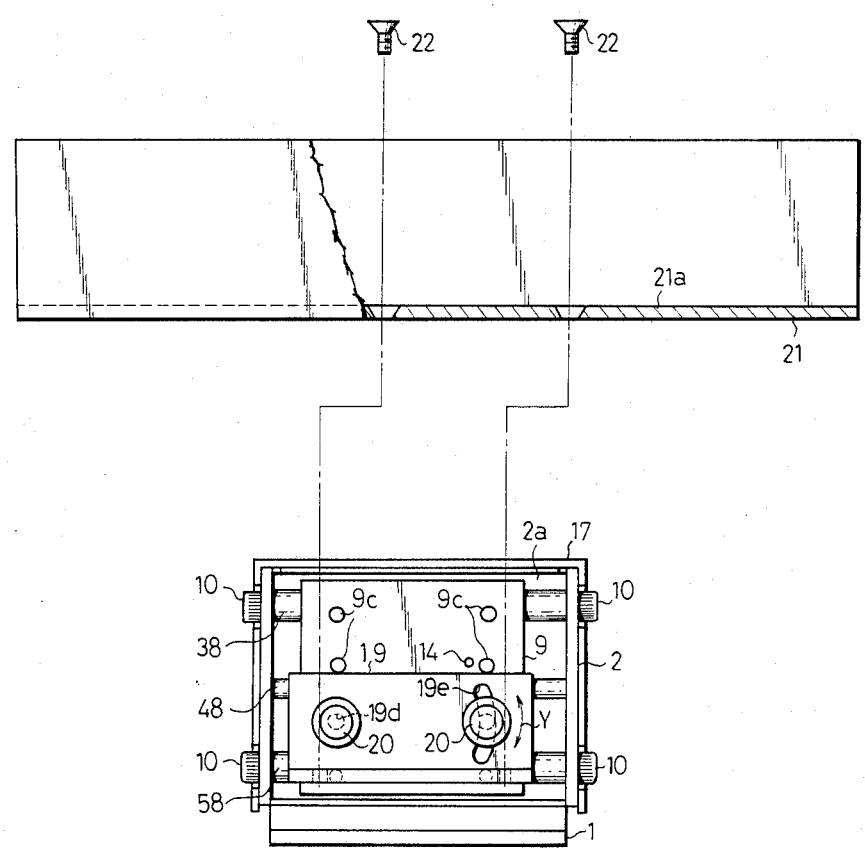
FIG. 4 is a partial exploded front elevational view showing a mounting portion in a mounting state.

A pair of bolt holes 19d, 19e are formed in the back plate 19a of the mounting member 19. One 19e of these holes has an arcuate form as shown in FIGS. 1 and 4. The arrangement is such that, after loosening of the bolts 20a, 20b, the mounting member 19 can rotate in the vertical direction as indicated by arrows Y, thus allowing adjustment of the angle of inclination of the discharging trough 21.

The conveyor apparatus described hereinbefore is adapted to be attached to the body 23 of a press, more particularly, to a portion of the press body 23 corresponding to a lower die 25 on a table 24 of the press, through a supporting member 26, as shown in FIGS. 5 and 6. The apparatus 101 shown in FIG. 5 is usable as the means for discharging scraps, while apparatus 102 shown in FIG. 5 is intended for the discharge of pressed products. Both the apparatus 101 and 102 have an identical construction, so that the following description of the apparatus 101 also applies to the other apparatus 102.

Referring to FIG. 7, the base plate 1 of the apparatus 101 is secured to the upper side of the suporting member 26 by means of bolts 27. In this state, the discharging trough 21 is set at a predetermined level and inclination angle α with respect to the reciprocating member 9, by means of the mounting member 19. The upper end of the discharging trough 21 is extended to a position where it can catch scraps dropping from the press, while the lower end extends to a predetermined position on the left side of the press.

The operation of the conveyor apparatus for conveying pressed products or other items, having a construction explained hereinbefore, operates in a manner which will be described hereinunder.

Figure 8:
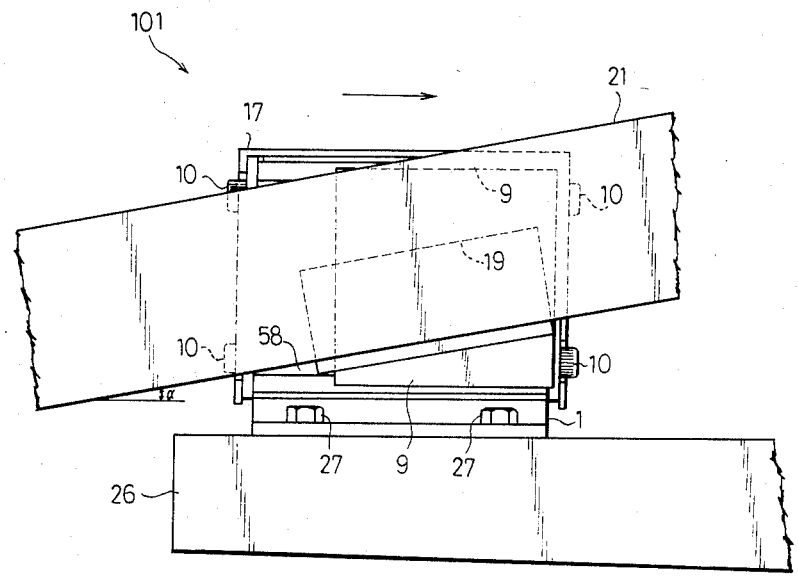
FIG. 8 is a front elevational view of a press equipped with the apparatus of the invention shown in FIG. 1.

The motor 4 is started by turning on a power switch (not shown), so that the shaft 5 and, hence, the cam 6 are rotated clockwise as viewed in FIG. 2. During the rotation, the cam 6 is slidingly contacted with the cam follower 13 which is secured to the reciprocating member 9. While the cam follower 13 is held in sliding contact with the projection 6d of the cam 6, the reciprocating member 9 is gently moved to the right as shown in FIG. 8, against the forces of both coiled springs 11. As the eccentric cam 6 further rotates to cause the cam follower 13 to be received in the recess 6e, the reciprocating member 9 is instantaneously returned leftward to the initial position, by the force of the coiled springs 11. In this state, the right side portion 9f of the reciprocating member 9 abuts the right end of the coiled spring 12 on the guide pin 48. The coiled spring 12 produces a buffering effect so as to reduce the impact or noise when the reciprocating member 9 returns leftward, and serves to prevent the reciprocating member from 9 moving leftward abruptly.

This operation of the reciprocating member 9 is repeated as the cam 6 rotates continuously. In consequence, the discharging trough 21 moves reciprocatingly and continuously to the left and right together with the reciprocating member 9.

As the press 23 starts to operate to process a metallic material, scraps are formed on the table 24 of press 23. These scraps fall onto the upper end of the discharging trough 21. Since there is a difference between the forward moving speed and backward movement speed of the trough 21, the scraps in the trough are moved without stagnating therein, as a result of the reciprocatory movement of the trough 21. Namely, the scraps slide on the bottom surface 21a and are fed obliquely down and leftwardly in the discharging direction. The conveyance of the scraps is promoted by the abrupt stopping of the reciprocating member 9.

The conveyor apparatus of the invention can adapt to a variety of objects having different shapes and weights, simply by adjustment of angle α of inclination of the trough.

It is to be noted also that the conveyor apparatus of the invention can be set optimumly for various types of presses, because the level of the discharging trough 21 with respect to the reciprocating member 9 is adjustable.

The invention can be carried out in various forms as follows:

(1) Instead of the quick feed/slow return action hereinbefore described, a slow feed/quick return action may be imported to reciprocating member 9.

Figure 9:
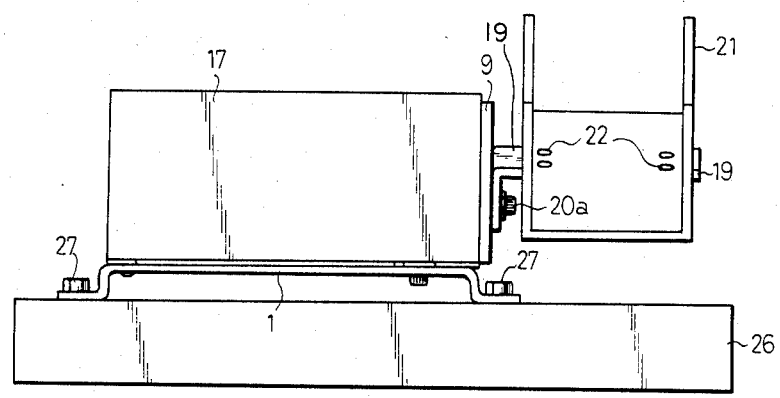
FIGS. 9 and 10 are side elevational views of different embodiments of the invention.
Figure 10:
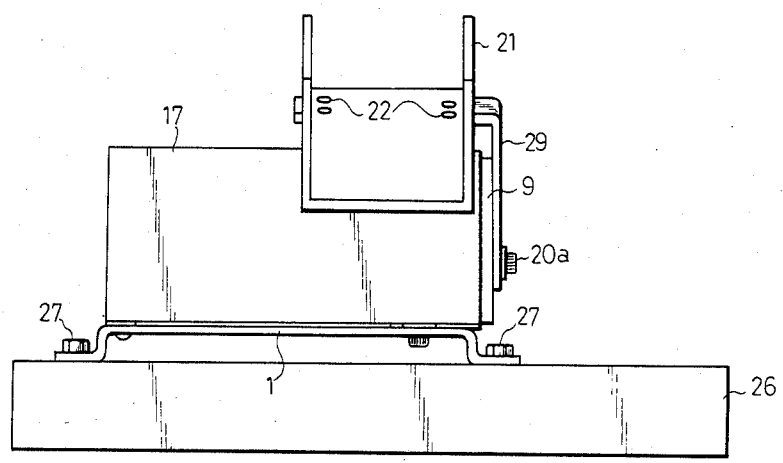

(2) To use the mounting member 19 of the discharging trough 21 in upside-down condition as shown in FIG. 9.

(3) To install the discharging trough 21 on the reciprocating member 9, through the mounting member 29, at a position above the motor cover 17.

(4) To fix the mounting member 19 of the discharging trough 21 in a horizontal posture or at a fixed inclination angle, in such a manner as not to allow the adjustment of the angle.

(5) To fix the discharging trough 21 directly on the reciprocating member 9 while eliminating the mounting member 19 and providing holes on a side portion of the discharging trough 21.

(6) To use a driving mechanism capable of generating a reciprocating action, e.g., a piston rod which moves reciprocatingly by compressed air.

As will be understood from the foregoing description, the present invention provides a conveyor apparatus which is simple in construction and small in size and easy to mount on a variety of types of press, while ensuring a smooth discharge of pressed products and scraps.

Although the invention has been described through specific terms, it is to be noted here that the described embodiments are only illustrative and various changes and modifications may be imparted thereto without departing from the scope of the invention which is limited solely by the appended claims.

What is claimed is:

1. Apparatus for conveying and discharging production and scrap products from a press (23), said apparatus comprising:
   an elongated discharging trough (21);
   a reciprocating member (9) operatively connected to said trough to drive the latter reciprocatively generally parallel to its longitudinal axis;
   a driving mechanism operatively connected to said reciprocating member to drive the latter forward and backward with a reciprocatory action that provides a substantial difference in speed between forward and backward movement of said member whereby products loaded into said trough are discharged through an opening at its front end;
   said driving mechanism including a cam (6) having a generally S-shaped camming surface (6d, 6e) rotatable on a rotational axis (5) that is generally perpendicular to said longitudinal axis, a cam follower (13) mounted on said reciprocating member, biasing means (11) urging said follower toward said camming surface whereby said cam drives said reciprocating member rearward during a first portion of a rotation cycle for said cam;
   said camming surface being shaped to separate from said follower during a second portion of said cycle and permit said biasing means to drive said reciprocating member forward, with speed of forward motion for said reciprocating member exceeding its rearward speed.

2. An apparatus for conveying and discharging production and scrap products from a press according to claim 1, wherein said discharging trough (21) is mounted at an inclination such that the front end of said trough is held at a lower level than its rear end.

3. An apparatus for conveying and discharging production and scrap products from a press according to claim 1, further comprising an adjusting means for adjusting at least one position of height and inclination positions for said discharging trough.

4. An apparatus for conveying and discharging production and scrap products from a press according to claim 3, wherein said adjusting means also includes a mounting member (19) secured to said reciprocating member (9) and supporting said discharging trough (21), a pair of bolts (20a, 20b) extending through said mounting member (19) and driven into said reciprocating member (9) at a selected position heightwise, and a hole (19e) formed in said mounting member (19) such as to allow one (20b) of said bolts (20a, 20b) to pass therethrough, said hole (19e) allowing said mounting member (19) to pivot about the other bolt (20a) as a center.

5. An apparatus for conveying and discharging production and scrap products from a press according to claim 1, wherein said cam (6) is composed of a plurality of cam segments stacked and fixed in layers so as to have a considerable thickness.

6. An apparatus for conveying and discharging production and scrap products from a press according to claim 1, further comprising a supporting frame (2) for supporting said reciprocating member (9), said supporting frame (2) having first and third pins (38, 58) spaced in the vertical direction and adapted to guide said reciprocating member in the horizontal direction, said biasing means comprising first and second coiled springs (11) mounted on individual ones of said first and third guide pines, each of said guide first and third pins having a formation (38a, 58a), one end of each of said coiled springs engaging individual ones of said formations and the other ends of said coiled springs engaging with a portion (9a) of said reciprocating member (9).

7. An apparatus for conveying and discharging production and scraps products from a press according to claim 6, wherein said supporting frame (2) further includes a second guide pin (48) between said first and third guide pins (38, 58), said second guide pin (48) supporting a coiled spring (12) which is adapted to be engaged with a portion of said reciprocating member (9) during forward movement of said reciprocating member (9), thereby reducing the impact of said reciprocating member (9).

* * * * *